US012586291B2

(12) United States Patent     (10) Patent No.:     US 12,586,291 B2
Xu et al.                          (45) Date of Patent:       Mar. 24, 2026

(54) FAST LARGE-SCALE RADIANCE FIELD RECONSTRUCTION

(71) Applicants: Adobe Inc., San Jose, CA (US); The Regents of the University of California, Oakland, CA (US)

(72) Inventors: Zexiang Xu, San Jose, CA (US); Xiaoshuai Zhang, San Diego, CA (US); Sai Bi, San Jose, CA (US); Kalyan Sunkavalli, San Jose, CA (US); Hao Su, San Diego, CA (US)

(73) Assignees: Adobe Inc., San Jose, CA (US); The Regents of the University of California, Oakland, CA (US)

( * ) Notice:     Subject to any disclaimer, the term of this patent is extended or adjusted under 35 U.S.C. 154(b) by 216 days.

(21) Appl. No.: 18/185,230

(22) Filed:     Mar. 16, 2023

(65)          Prior Publication Data

US 2024/0312118 A1     Sep. 19, 2024

(51) Int. Cl.
*G06T 15/08*          (2011.01)
*G06T 15/06*          (2011.01)
*G06T 15/20*          (2011.01)

(52) U.S. Cl.
CPC .............. *G06T 15/08* (2013.01); *G06T 15/06* (2013.01); *G06T 15/205* (2013.01)

(58) Field of Classification Search
CPC ....... G06T 15/08; G06T 15/06; G06T 15/205; G06T 15/20
See application file for complete search history.

(56)          References Cited

U.S. PATENT DOCUMENTS

| | | | |
|---|---|---|---|
| 10,682,108 B1* | 6/2020 | Ma .................. A61B 1/000096 |
| 2019/0050999 A1* | 2/2019 | Piat ......................... G06T 19/20 |
| 2023/0420114 A1* | 12/2023 | Scholler ................... G06T 7/11 |

OTHER PUBLICATIONS

Jisan Mahmud, VPFusion: Joint 3D Volume and Pixel-Aligned Feature Fusion for Single and Multi-view 3D reconstruction,2022 (Year: 2022).*
Zheng, Zerong, et al. "Structured local radiance fields for human avatar modeling." Proceedings of the IEEE/CVF Conference on Computer Vision and Pattern Recognition. 2022. (Year: 2022).*
Tancik, Matthew, et al. "Block-nerf: Scalable large scene neural view synthesis." Proceedings of the IEEE/CVF conference on computer vision and pattern recognition. 2022.) (Year: 2022).*
Aliev et al., "Neural Point-Based Graphics", arXiv:1906.08240V3, Apr. 5, 2020, pp. 1-16.

(Continued)

*Primary Examiner* — Daniel F Hajnik
*Assistant Examiner* — Chris Alejandro Puntier
(74) *Attorney, Agent, or Firm* — Nicholson De Vos Webster & Elliott LLP

(57)          ABSTRACT

Embodiments are disclosed for fast large-scale radiance field reconstruction. A method of fast large-scale radiance field reconstruction may include receiving a sequence of input images that depict views of a scene and extracting, using an image encoder, image features from the sequence of input images. A first one or more machine learning models may generate a local volume based on the image features corresponding to one or more images from the sequence of input images. A second one or more machine learning models may generate a global volume based on the local volume. A novel view of the scene is synthesized based on the global volume.

20 Claims, 9 Drawing Sheets

(56) References Cited

OTHER PUBLICATIONS

Bi et al., "Deep Reflectance Volumes Relightable Reconstructions from Multi-View Photometric Images", arXiv:2007.09892v1, Jul. 20, 2020, 21 pages.

Bi et al., "Neural Reflectance Fields for Appearance Acquisition", arXiv:2008.03824v2, Aug. 16, 2020, 11 pages.

Bi et al., "Patch-Based Optimization for Image-Based Texture Mapping", ACM Transactions on Graphics, vol. 36, No. 4, Article 106, Jul. 2017,11 pages.

Božic et al., "TransformerFusion: Monocular RGB Scene Reconstruction using Transformers", arXiv:2107.02191v1, Jul. 5, 2021, 17 pages.

Boss et al., "NeRD: Neural Reflectance Decomposition from Image Collections", In Proceedings of the IEEE/CVF International Conference on Computer Vision, 2021, pp. 1-15.

Chen et al., "MVSNeRF: Fast Generalizable Radiance Field Reconstruction from Multi-View Stereo", arXiv:2103.15595, 2021, 13 pages.

Chen et al., "Point-Based Multi-View Stereo Network", arXiv:1908.04422v1, Aug. 12, 2019, pp. 1-13.

Cheng et al., "Deep Stereo using Adaptive Thin Volume Representation with Uncertainty Awareness", arXiv:1911.12012v2, Apr. 18, 2020, 15 pages.

Cho et al., "Learning Phrase Representations using RNN Encoder-Decoder for Statistical Machine Translation", arXiv:1406.1078v3, Sep. 3, 2014, 15 pages.

Dai et al., "ScanNet: Richly-annotated 3D Reconstructions of Indoor Scenes", arXiv:1702.04405v2, Apr. 11, 2017, 22 pages.

Downs et al., "Scanned Objects by Google Research: A Dataset of 3D-Scanned Common Household Items", available online at <https://research.google/blog/scanned-objects-by-google-research-a-dataset-of-3d-scanned-common-household-items/>, Jun. 14, 2022, 9 pages.

Gu et al., "Cascade Cost Volume for High-Resolution Multi-View Stereo and Stereo Matching", arXiv:1912.06378v3, Jun. 5, 2020, 15 pages.

Hedman et al., "Baking Neural Radiance Fields for Real-Time View Synthesis", arXiv:2103.14645v1, Mar. 26, 2021, pp. 1-15.

Hedman et al., "Deep Blending for Free-Viewpoint Image-Based Rendering", ACM Transactions on Graphics, vol. 37, No. 6, Article 257, Nov. 2018, pp. 257:1-257:15.

Huang et al., "DeepMVS: Learning Multi-view Stereopsis", arXiv:1804.00650v1, Apr. 2, 2018, pp. 1-10.

Jensen et al., "Large Scale Multi-view Stereopsis Evaluation", CVF, 2014, pp. 1-8.

Ji et al., "SurfaceNet: An End-to-end 3D Neural Network for Multiview Stereopsis", arXiv: 1708.01749v1, Aug. 5, 2017, pp. 1-9.

Kar et al., "Learning a Multi-View Stereo Machine", arXiv:1708.05375v1, Aug. 17, 2017, pp. 1-13.

Kopanas et al., "Point-Based Neural Rendering with Per-View Optimization", Eurographics Symposium on Rendering 2021, vol. 40 (2021), No. 4, 15 pages.

Lassner et al., "Pulsar: Efficient Sphere-based Neural Rendering", CVF, 2021, pp. 1440-1449.

Li et al., "Neural Scene Flow Fields for Space-Time View Synthesis of Dynamic Scenes", CVF, 2021, pp. 6498-6508.

Liu et al., "Neural Sparse Voxel Fields", Jan. 6, 34th Conference on Neural Information Processing Systems (NeurIPS 2020), 22 Pages.

Lombardi et al., "Neural Volumes: Learning Dynamic Renderable Volumes from Images", ACM Trans. Graph, vol. 38, No. 4, Article 65, Jul. 2019, pp. 65:1-65:14.

Luo et al., "P-MVSNet: Learning Patch-wise Matching Confidence Aggregation for Multi-View Stereo", CVF, 2019, pp. 10452-10461.

Martin-Brualla et al., "NeRF in the Wild: Neural Radiance Fields for Unconstrained Photo Collections", arXiv:2008.02268v3, Jan. 6, 2021, pp. 1-15.

Mildenhall et al., "NeRF: Representing Scenes as Neural Radiance Fields for View Synthesis", arXiv:2003.08934v2, Aug. 3, 2020, pp. 1-25.

Newcombe et al., "KinectFusion: Real-Time Dense Surface Mapping and Tracking", 10th IEEE international symposium on mixed and augmented reality, IEEE, 2011, 10 pages.

Nießner et al., "Real-time 3D Reconstruction at Scale using Voxel Hashing", ACM Transactions on Graphics (ToG), 32(6), Nov. 1, 2013, 11 pages.

Park et al., "HyperNeRF: A Higher-Dimensional Representation for Topologically Varying Neural Radiance Fields", arXiv:2106.13228v2, Sep. 10, 2021, 16 pages.

Park et al., "Nerfies: Deformable Neural Radiance Fields", In Proceedings of the IEEE/CVF International Conference on Computer Vision, Sep. 10, 2021, pp. 1-18.

Pizzoli et al., "Remode: probabilistic, monocular dense reconstruction in real time", IEEE International Conference on Robotics and Automation (ICRA), 2014, 9 pages.

Rückert et al., "ADOP: Approximate Differentiable One-Pixel Point Rendering", arXiv:2110.06635v3, May 3, 2022, pp. 99:1-99:14.

Schonberger et al., "Pixelwise View Selection for Unstructured Multi-View Stereo", In European Conference on Computer Vision (ECCV), 2016, 17 pages.

Seitz et al., "A Comparison and Evaluation of Multi-View Stereo Reconstruction Algorithms", In 2006 IEEE computer society conference on CVPR, vol. 1, 2006, 8 pages.

Srinivasan et al., NeRV: Neural Reflectance and Visibility Fields for Relighting and View Synthesis, arXiv:2012.03927v1, Dec. 7, 2020, pp. 1-12.

Sun et al., "NeuralRecon: Real-Time Coherent 3D Reconstruction from Monocular Video", arXiv:2104.00681v1, Apr. 1, 2021, pp. 1-10.

Tang et al.,"Searching Efficient 3D Architectures with Sparse Point-Voxel Convolution", arXiv:2007.16100v2, Aug. 13, 2020, pp. 1-23.

Wang et al., "IBRNet: Learning Multi-View Image-Based Rendering", arXiv:2102.13090v2, Apr. 6, 2021, pp. 1-15.

Weder et al., "RoutedFusion: Learning Real-time Depth Map Fusion", arXiv:2001.04388v2, Apr. 3, 2020, pp. 1-17.

Wei et al., "NerfingMVS: Guided Optimization of Neural Radiance Fields for Indoor Multi-View Stereo", In ICCV, 2021, 11 pages.

Xiang et al., "NeuTex: Neural Texture Mapping for Volumetric Neural Rendering", arXiv:2103.00762v1, Mar. 1, 2021, pp. 1-13.

Yao et al., "MVSNet: Depth Inference for Unstructured Multi-View Stereo", arXiv:1804.02505v2, Jul. 17, 2018, pp. 1-17.

Yao et al., "Recurrent MVSNet for High-resolution Multi-view Stereo Depth Inference", arXiv:1902.10556v1, Feb. 27, 2019, 15 pages.

Yu et al., "pixelNeRF: Neural Radiance Fields from One or Few Images", arXiv:2012.02190v3, May 30, 2021, 20 pages.

Zhou et al., "Color Map Optimization for 3D Reconstruction with Consumer Depth Cameras", ACM Transactions on Graphics, 33(4):155, 2014, 10 pages.

* cited by examiner

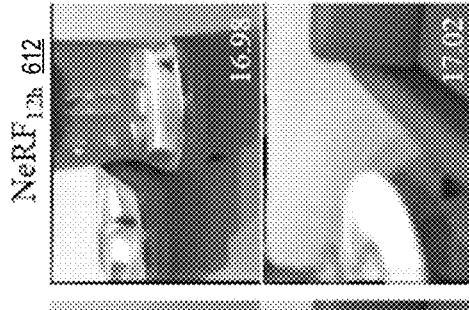
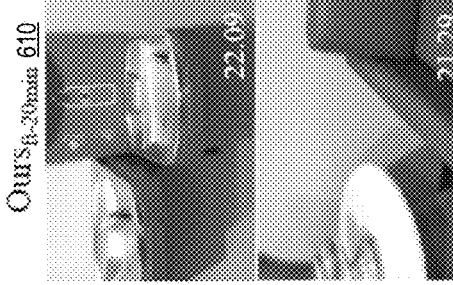
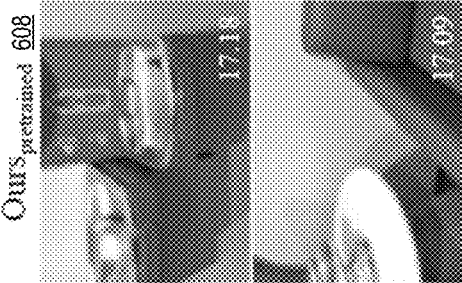
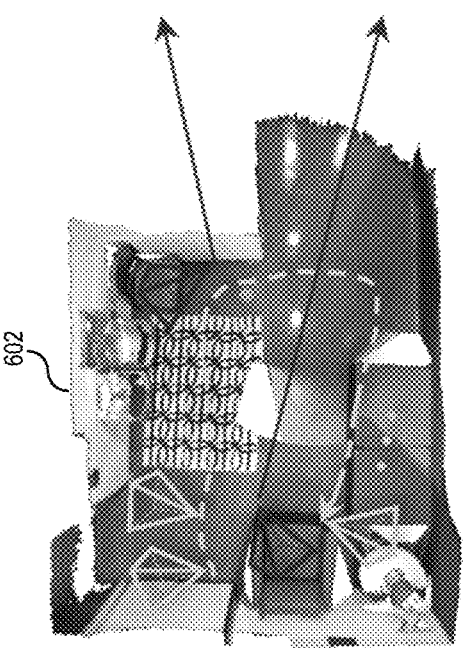
*FIG. 6*

800

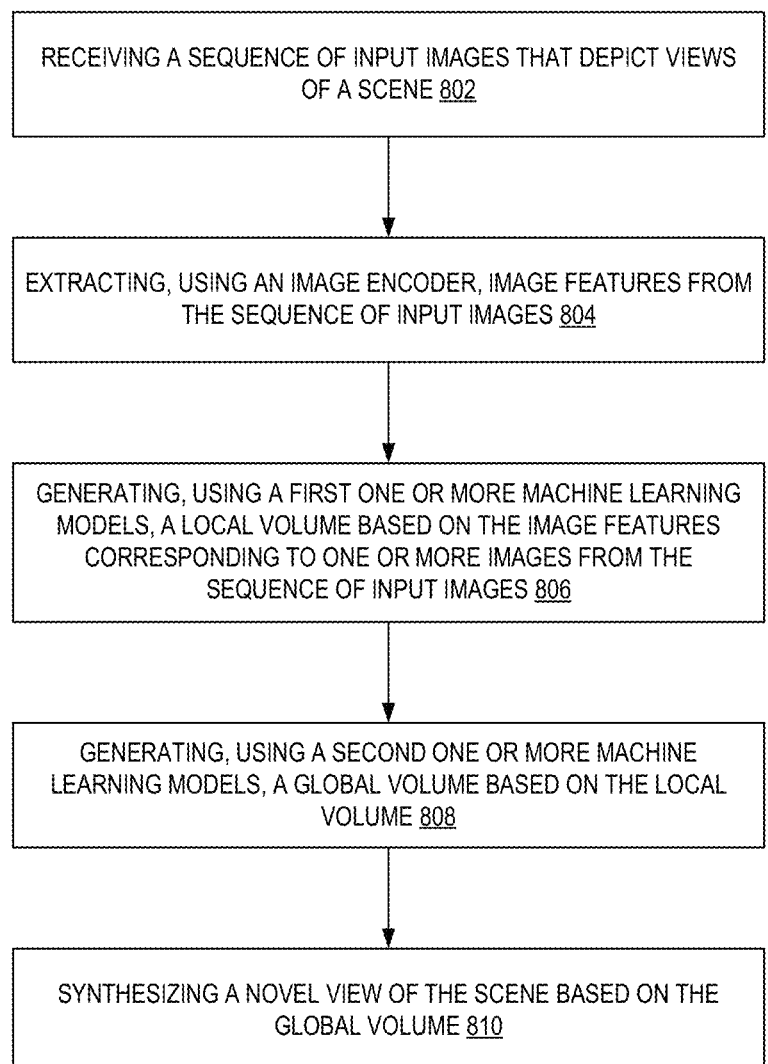

RECEIVING A SEQUENCE OF INPUT IMAGES THAT DEPICT VIEWS OF A SCENE 802

EXTRACTING, USING AN IMAGE ENCODER, IMAGE FEATURES FROM THE SEQUENCE OF INPUT IMAGES 804

GENERATING, USING A FIRST ONE OR MORE MACHINE LEARNING MODELS, A LOCAL VOLUME BASED ON THE IMAGE FEATURES CORRESPONDING TO ONE OR MORE IMAGES FROM THE SEQUENCE OF INPUT IMAGES 806

GENERATING, USING A SECOND ONE OR MORE MACHINE LEARNING MODELS, A GLOBAL VOLUME BASED ON THE LOCAL VOLUME 808

SYNTHESIZING A NOVEL VIEW OF THE SCENE BASED ON THE GLOBAL VOLUME 810

*FIG. 8*

FAST LARGE-SCALE RADIANCE FIELD RECONSTRUCTION

BACKGROUND 3D reconstruction attempts to reproduce the appearance of 3D scenes from multi-view data. For example, a collection of images each capturing different views of a scene (e.g., multi-view data) may be used to reconstruct the 3D scene, allowing for new views not captured by the input images to be rendered. Reconstructing and rendering large-scale indoor scenes from image data is challenging but crucial for various applications in computer vision and graphics, including augmented reality, virtual reality, e-commerce, and robotics.

SUMMARY

Introduced here are techniques/technologies that enable fast large-scale radiance field reconstruction. The scene reconstruction system models a scene as neural volumetric radiance fields. In particular, embodiments extract image features from an input image sequence (e.g., a continuous input video or sampling thereof). As each image is processed, the image features from that image and neighboring images are used by a local volume reconstruction module to generate a local volume. The local volume is added (e.g., fused) to the global volume by a global fusion module. As such, the global fusion module incrementally reconstructs a large-scale sparse radiance field from an input image sequence.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 6 illustrates a comparison of fast reconstruction of volumetric radiance fields of large-scale scenes in accordance with one or more embodiments;

FIG. 8 illustrates a flowchart of a series of acts in a method of fast large-scale radiance field reconstruction in accordance with one or more embodiments.

DETAILED DESCRIPTION

Figure 1:
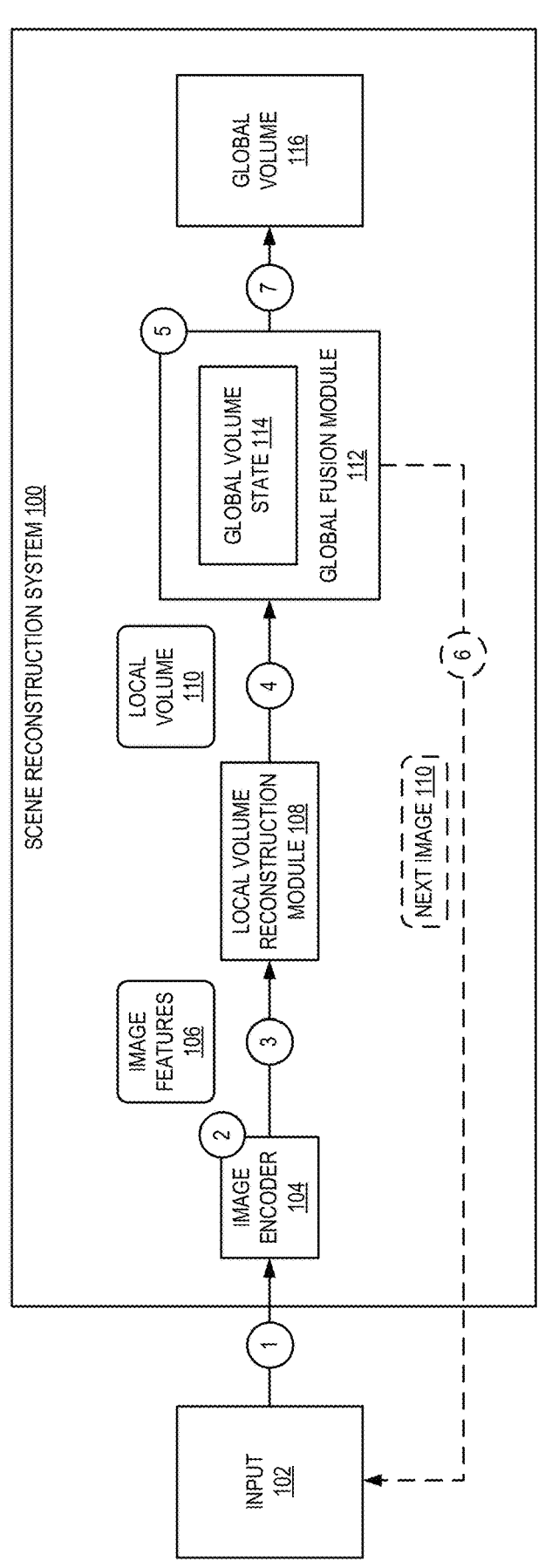
FIG. 1 illustrates a diagram of a process of scene reconstruction in accordance with one or more embodiments.

One or more embodiments of the present disclosure include a framework for fast large-scale radiance field reconstruction for photo-realistic novel view synthesis. Prior attempts at 3D reconstruction have applied multi-view stereo or depth sensors to acquire depth information of a scene and use this depth information to reconstruct the scene's geometry. More recently, the depth information has been estimated using learning-based multi-view stereo methods based on plane-swept cost volumes. Using the depth information, one category of previous methods represents scenes with colored point clouds and utilize point splatting to render images of the scene. Another category of methods fuses multi-view depth and reconstructs surface meshes using techniques such as truncated signed distance function (TSDF) fusion or Poisson reconstruction, and further generates textures from multi-view images.

However, these prior techniques are sensitive to potential inaccuracies in point clouds and meshes resulting from corrupted depth information, especially when there are thin structures and texture-less regions. This can result in holes and blurry artifacts in the final renderings. Additionally, while some attempts have been made to apply neural networks, such as a 2D convolutional neural network (CNN), in screen-space to mitigate potential errors in the geometry, these models are per-scene optimized for a specific scene. This leads to a very long reconstruction time (e.g., twelve hours or more). Moreover, the screen-space neural networks typically produce temporally unstable results with flickering artifacts. Instead of estimating and fusing per-view depth, previous methods introduce learning-based methods to aggregate per-view features and predict opacity volumes or signed distance volumes. These methods only focus on geometry reconstruction and cannot produce realistic renderings.

To address these and other deficiencies in conventional systems, the scene reconstruction system of the present disclosure models a scene as neural volumetric radiance fields and can reproduce a faithful scene appearance, producing photo-realistic novel view synthesis results. In particular, embodiments can perform fast radiance field reconstruction on large-scale scenes. As used herein, "large-scale" refers to full-size indoor scenes, such as those in the ScanNet dataset, which include multiple rooms and objects with complex scene geometry and appearance.

To achieve fast radiance field reconstruction on such challenging scenes, embodiments use a novel neural framework that uses recurrent neural modules to incrementally reconstruct a large sparse radiance field from an input image (e.g., RGB) sequence. Unlike prior neural techniques, such as NeRF, that require per-scene optimization, embodiments of the scene reconstruction system are generalizable, pretrained across scenes, and able to efficiently reconstruct large-scale radiance fields via direct network inference.

A reconstructed radiance field is represented by a sparse volume grid with per-voxel neural features. In some embodiments, these voxel features are tri-linearly interpolated at any scene location and used to regress volume density and view-dependent radiance through a decoder for differentiable volume rendering. In contrast to previous methods that reconstruct similar representations using slow per-scene optimization, embodiments use a deep neural network that can be trained across scenes and generalize on unseen novel scenes to achieve fast radiance field reconstruction, bypassing per-scene fitting.

In some embodiments, given an input sequence of RGB images with known camera poses (e.g., that can be registered by SLAM or SfM techniques), a radiance field is reconstructed as a sparse neural volume. The input sequence is processed similarly to processing performed in the classical truncated signed distance function (TSDF) fusion workflow that starts from per-view geometry (depth) and fuses the per-view reconstruction across key frames to obtain a global sparse TSDF volume. While the classic version of this workflow is widely used to reconstruct largescale scenes, it is only used for geometric reconstruction, and cannot produce photo-realistic results. Instead, embodiments use neural modules to reconstruct radiance fields as sparse voxels for photo-realistic rendering.

In some embodiments, local radiance fields are reconstructed for each input key frame. For example, a world-space cost-volume is built from unprojected 2D image features (e.g., regressed from a deep 2D convolutional neural network) of neighboring key frames. Sparse 3D convolutions may be applied to the cost-volume to reconstruct sparse neural voxels that represent a local radiance field. Once estimated, this field can be used to render realistic images locally, though only for partial scene content seen by the local frames. In order to make this work for large scenes, a recurrent neural fusion module is used to sequentially fuse multiple local fields across frames. The fusion module recurrently takes a newly estimated local field as input and learns to incorporate the local voxels to progressively reconstruct a global radiance field modeling the entire scene. The updates may include adding new voxels and/or updating existing voxels. The full model is trained from end to end, learning to reconstruct radiance fields with arbitrary scene scales from an arbitrary number of input images. This allows for direct network output to render high-quality images, without requiring scene-specific training. Moreover, scene-specific fine tuning may be applied to the neural field to optimize the predicted voxel features and achieve better rendering quality. This fine-tuning may be performed on the order of minutes and result in rendering quality equal to or better than prior techniques that require hours or days of scene-specific training. As noted, the framework is trained from end to end with only rendering losses on a combination of scenes from various training datasets. Some examples of training datasets that may be used include Scan-Net, DTU, and Google Scanned Object datasets. Any training dataset may be used which includes a large variety of different objects and scenes.

As a result, the scene reconstruction system outperforms prior art systems, including IBRNet that also designs networks that generalize across scenes, as well as NeRF. In particular, on large-scale indoor scenes, the scene reconstruction system performs in real-time direct network inference on par with NeRF's results which require long per-scene optimization. Moreover, after less than an hour of per-scene fine-tuning, embodiments output state-of-the-art quality results, outperforming NeRF and NVSF each of which require much longer per-scene optimization times. Accordingly, embodiments allow for efficient and scalable radiance field reconstruction. This enables practical neural scene reconstruction and rendering that saves significant time and computing resources as compared to prior techniques.

FIG. 1 illustrates a diagram of a process of scene reconstruction in accordance with one or more embodiments. Scene reconstruction may be performed by a scene reconstruction system 100. The scene reconstruction system 100 may be implemented as a standalone application, a cloud- or service-based application, etc. In some embodiments, the scene reconstruction system 100 may be implemented as part of a larger image and/or video processing application or suite of applications.

Given an input sequence of images, $I_1, \ldots, I_N$ of a large-scale scene with their known camera parameters $\Phi_1, \ldots, \Phi_N$, scene reconstruction system 100 reconstructs a radiance field modeling the entire scene for realistic rendering. For example, as shown in FIG. 1, the scene reconstruction system 100 receives input 102. In some embodiments, input 102 may include a video or any other sequence of images. For example, a monocular camera may be used to capture continuous video of a scene to be used for reconstruction. Alternatively, the input may be a sampling of such video. Each image in the input 102 has corresponding known camera parameters (e.g., camera poses registered via SLAM, SfM techniques, etc.). At numeral 1, an image from the input 102 is passed to image encoder 104. Image encoder 104 may include a convolutional neural network (CNN) or other machine learning model which extracts 2D features from the input images. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As shown at numeral 2, the image encoder 104 processes the received image and outputs corresponding image features 106. In some embodiments, all of the images from input 102 may be processed by image encoder 104 to create corresponding image features 106. Alternatively, only a subset of the images (e.g., key frames) are processed by the image encoder 104. At numeral 3, the image features are received by local volume reconstruction module 108. As discussed further below, local volume reconstruction module 108 includes a machine learning model, such as a 3D CNN, that regresses a local volume 110 based on the image features of the current image being processed and one or more neighboring views.

At numeral 4, the local volume is provided to fusion module 112. Fusion module 112 may include a machine learning model that maintains a state, such as a recurrent neural network (RNN). The fusion module 112 receives the local volume 110 and adds it to the global volume state 114, at numeral 5. The fusion module 112 is a global neural volume fusion network which incrementally fuses local feature volumes into a global volume. In some embodiments, the fusion module includes a combination of gated recurrent units and 3D CNNs, allowing the fusion module 112 to learn to recurrently fuse the per-frame local reconstruction and output high-quality global radiance fields. For example, at numeral 6, if additional images remain in input 102, then a next image is processed by the scene reconstruction system 100 and the resulting new local volume is fused to the global volume (represented by global volume state 114). By performing this fusion incrementally, features can be refined, and holes filled in, as new data (e.g., new local volumes) is received. Once all images have been processed, the global volume state 114 is output as global volume 116, at numeral 7. The global volume is a sparse neural volume that represents a radiance field. The global volume can then be used to synthesize novel views of the scene using, e.g., a volume renderer, as discussed further below.

Figure 2:
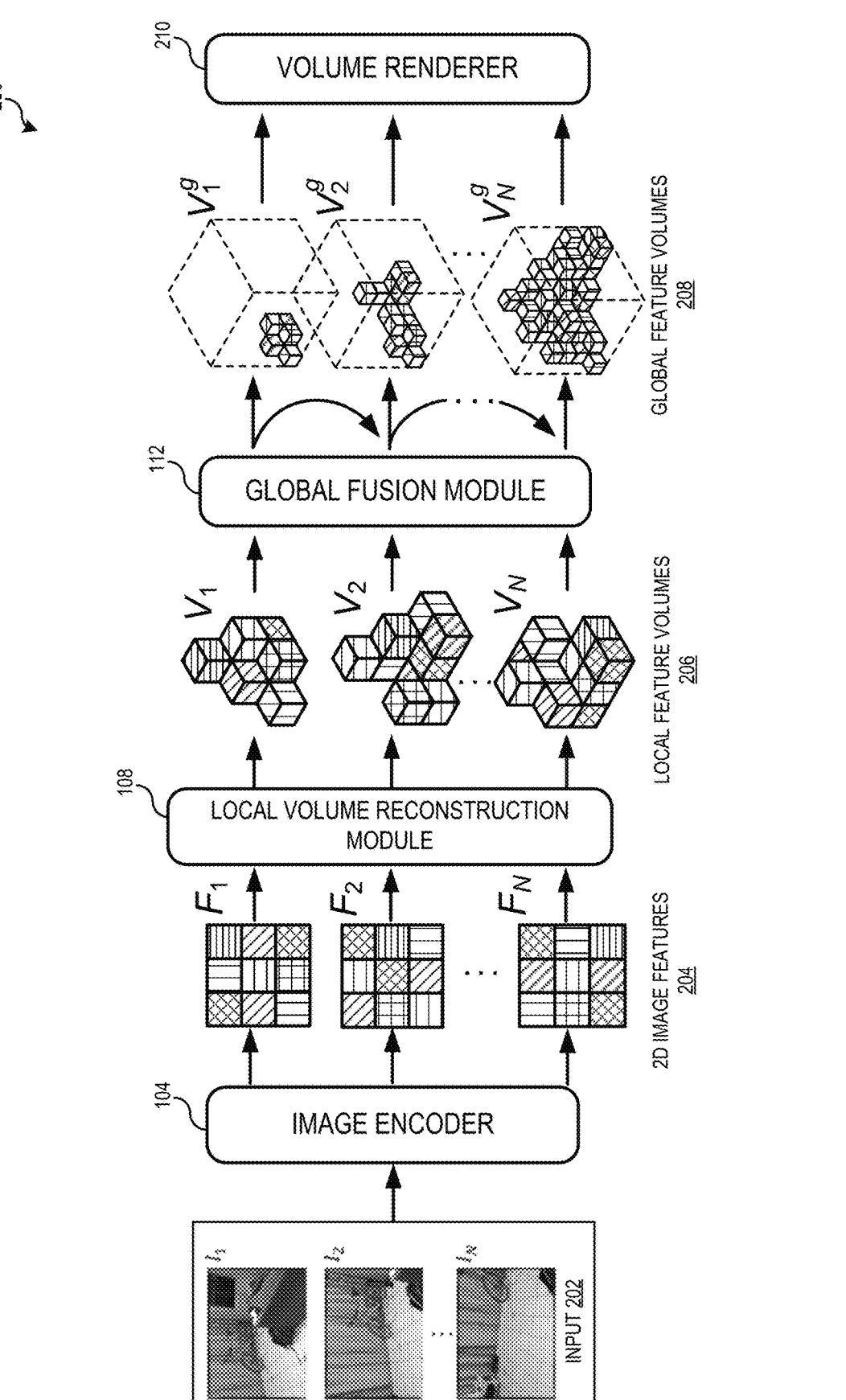
FIG. 2 illustrates a diagram of a framework for reconstructing a neural volume for a scene from a sequence of input images in accordance with one or more embodiments.

FIG. 2 illustrates a diagram of a framework 200 for reconstructing a neural volume for a scene from a sequence of input images in accordance with one or more embodiments. The framework 200 uses a deep neural network to regress a local neural volume for each input frame t, using its image $I_t$ and K−1 images from neighboring views. Usually, given a monocular video, these neighboring views correspond to temporal neighboring frames. Using multiple nearby images for per-frame reconstruction allows the network to leverage multi-view correspondence to recover better scene geometry than using a single image alone.

To make the local reconstruction per frame well generalized across scenes, embodiments use deep multiview stereopsis (MVS) techniques which are known to be generalizable. Embodiments extract 2D image features, build a cost volume from the features, and regress a neural feature volume from the cost volume. However, unlike MVSNeRF and other MVS techniques that built frustum volumes in the view's perspective coordinates, the scene reconstruction system construct volumes in the canonical world coordinate frame to align it with the final global volume output $V_g$, facilitating the incremental fusion process.

As shown in FIG. 2, the input 202 includes a sequence of images $I_1$ to $I_N$. These are provided to image encoder 104. In some embodiments, the image encoder 104 is a deep 2D convolutional neural network which extracts 2D image features 204 for each input image. This network maps the input image $I_t$ into a 2D feature map $F_t$, encoding the scene content from each view. The 2D image features 204 are provided to local volume reconstruction module 108.

In some embodiments, a bounding box is determined that covers the frustums of all K neighboring viewpoints in the world coordinate frame. This bounding box includes a set of voxels in the canonical space. The bounding volume is axis-aligned with the world frame; each voxel inside it can be visible to a different number of neighboring views. In some embodiments, any voxels invisible to all views are masked out, leading to a sparse set of voxels in the bounding box. The image features are then unprojected into this volume for the local reconstruction.

For each neighboring viewpoint i and its feature map $F_i$, the local volume reconstruction module builds a 3D feature volume $U_i$. In particular, for each visible voxel centered at v, local volume reconstruction module 108 fetches the 2D image feature at its 2D projection from each neighboring view at frame t. In addition to pure image features, the corresponding viewing direction $d_i$ at v from each viewpoint and compute additional features using an MLP G. The per-view 3D volume $U_i$ is expressed by:

$$U_i(v) = [F_i(u_i), G_i(d_i)],$$

where $U_i(v)$ is the feature at a voxel centered at v, $u_i$ is the center's 2D projection in view i, [•,•], represents feature concatenation. Note that, the additional information of input viewing directions is encoded in the reconstruction process. This information makes the fusion module effectively account for the view-dependent effects captured across frames.

The features are aggregated across multiple neighboring viewpoints to regress a local volume $V_t$ at frame t, expressing a local radiance field. The mean and variance of the per-voxel features in $U_i$ are computed across neighboring viewpoints. Such operations have been widely used in building cost volumes in MVS-based techniques, where the mean can fuse per-view appearance information and the variance provides rich correspondence cues for geometry reasoning. These two operations are also invariant to the number/order of input which handles voxels that have different numbers of visible viewpoints. In some embodiments, the local volume reconstruction module 108 includes a deep neural network J to process the mean and variance features per voxel to regress the per-view reconstruction by $$V_t = J(\text{Mean}_{i \in N_t} U_i, \text{Var}_{i \in N_t} U_i),$$

where $N_t$ represents all K neighboring viewpoints use at frame t; and Mean and Var represent element-wise average and variance operations, respectively.

This results in regressing the local radiance field from the features across neighboring views. Unlike prior techniques which consider only local reconstruction and build perspective frustrum volumes for small-baseline rendering, embodiments use these local volumes for global large-scale reconstruction and rendering. Volumes are built directly in canonical space, naturally providing per-frame voxel inputs for the global fusion module 112.

As discussed, the global fusion module 112 receives the local feature volumes that are regressed by the local volume reconstruction module. These include the local radiance field for each input frame. In order to create a consistent, efficient, and extensible scene reconstruction, global fusion module 112 incrementally fuses local feature volumes $\{V_t\}$ per frame into a global volume $V^g$.

At each frame t, the global fusion module 112 considers its local sparse volume reconstruction $V_t$ and the global reconstruction $V_{t-1}^g$ from the previous frame as recurrent input. In some embodiments, the global fusion module 112 may include one or more Gated Recurrent Units (GRUs) with sparse 3D CNNs. The GRUs allow the global fusion module to learn to recurrently fuse the per-frame local reconstruction and output high-quality global radiance fields. This is expressed by:

$$z_t = M_z([V_{t-1}^g, V_t]),$$
$$r_t = M_r([V_{t-1}^g, V_t]),$$
$$\tilde{V}_t^g = M_t([r_t * V_{t-1}^g, V_t]),$$
$$V_t^g = (1 - z_t) * V_{t-1}^g + z_t * \tilde{V}_t^g,$$

where * is the element-wise multiplication, $z_t$ and $r_t$ are the update gate and the reset gate, $M_z$, $M_r$ and $M_t$ are deep neural networks with sparse 3D convolution layers. As in standard GRU, $M_z$ and $M_r$ are designed with sigmoid activation in the end, while $M_t$ uses tan h, allowing for the entire model to sequentially update the global reconstruction $V_t^g$ (seen as the hidden state in a GRU) for every input frame. In this process, the networks are applied on the voxels covered by the local volume $V_t$, all other voxels in the global volume are kept unchanged.

Intuitively, the update gate $z_t$ and reset gate $r_t$ in the GRU determine how much information from the previous global volume $V_{t-1}^g$ as well as how much information from the current local volume $V_t$ should be incorporated into the new global features. In this way, the global fusion module 112 can adaptively improve the global scene reconstruction by filling up holes and refining features while keeping the representation consistent. This fusion process is similar to previous 3D reconstruction pipelines that focus on geometry reconstruction; in contrast, neural feature volumes are instead reconstructed to represent neural radiance fields for volume rendering, leading to photo-realistic novel view synthesis.

The output radiance field (e.g., global feature volume 208) is modeled by a sparse neural volume V that has per-voxel neural features in voxels that approximately cover the actual scene surface. Volume density a and view-dependent radiance c are regressed at any given 3D location x from this volume using an MLP network, in which a feature vector is first tri-linearly sampled and then the MLP is used to convert the feature to volume properties, expressed by $$\sigma, c = R(x, d, V(x))$$

Here V(x) represents the trilinearly interpolated feature at x, R is the MLP, and d is the viewing direction in rendering. The output volume properties regressed from the volume can be directly used to synthesize images at novel target viewpoints via differentiable ray marching as is done in NeRF. This radiance field representation is similar to prior techniques that rely on per-scene optimization for the reconstruction. Unlike previous techniques, embodiments use neural networks trained across scenes to predict the neural volumes from image sequences.

In the pipeline, such sparse volumes are reconstructed locally as $V_t$ per frame t and also globally as $V^g$ for the entire sequence. The MLP network R is shared across all volumes in the training process. The local volumes and the global volume are both modeled in the canonical world space.

In some embodiments, non-essential voxels may be removed from the global volume (for example, to reduce the memory footprint of the global volume, improve rendering efficiency, etc.). To maximize the memory and rendering efficiency, the global volume reconstruction $V_t^g$ is adaptively pruned for every frame by removing the non-essential voxels that do not have any scene content inside. This pruning process can use the volume density in each voxel that was regressed by the radiance field which models the scene geometry.

In particular, voxels V are pruned if:

$$\min_{i=1...k} \exp(-\sigma(v_i)) > \gamma, v_i \in V$$

where $\{v_i\}_{i=1}^k$ are k uniformly sampled points inside voxel V, $\sigma(v_i)$ is the predicted density at location $v_i$, and $\gamma$ is a pruning threshold. This pruning step can be performed in both later training phase and inference phase once a global feature volume $V_t^g$ is obtained. By doing so, the global volume is made sparser, leading to more efficient reconstruction and rendering.

Figure 3:
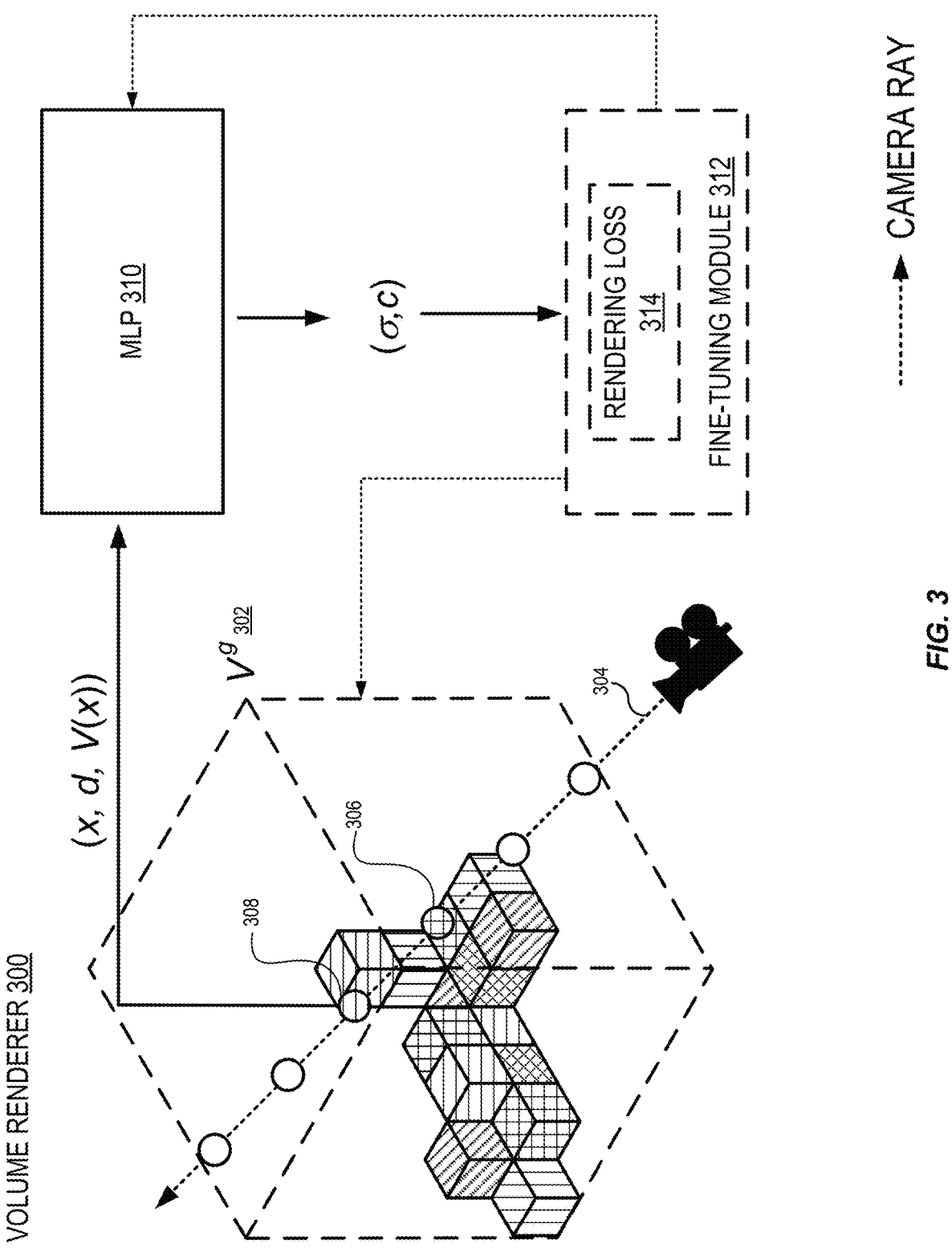
FIG. 3 illustrates a diagram of a process for rendering a novel view using a volume renderer in accordance with one or more embodiments.

FIG. 3 illustrates a diagram of a process for rendering a novel view using a volume renderer in accordance with one or more embodiments. As shown in FIG. 3, a volume renderer 300 can render a view of the scene from an arbitrary viewing direction and viewing location using the global volume $V^g$ 302. For example, a user, application, or other entity may select a viewing direction, d. A ray 304 is then marched from the viewing location in that viewing direction through the global volume $V^g$ 302. The volume renderer determines where that ray intersects voxels of the volume, such as at 306 and 308, and this information is provided to an MLP 310. MLP to regress the volume density, σ, and view-dependent radiance, c, at these points. Using the volume density and view dependent radiance, novel viewpoints are synthesized using volume rendering techniques, such as ray marching. For example, the final rendering may be achieved via differentiable ray marching using the regressed volume density and view-dependent radiance at any sampled ray points, as is done in prior radiance field techniques.

As discussed, in some embodiments, direct inference is used to generate novel viewpoints in real time or near real time. However, in some embodiments, fine-tuning may be applied to render more realistic views of the scene. To fine-tune the estimated radiance field, a fine-tuning module 312 optimizes the per-voxel neural features in the sparse volume reconstruction $V^g$ and the MLP decoder 310 per scene with the captured images, leading to better rendering results. Since the initial reconstruction provides state-of-the-art or near state-of-the-art rendering results, a short period of optimization with less than 25 k iterations can usually lead to very high quality, which takes less than one hour. This is substantially less optimization time than NeRF and other pure per-scene optimization methods require.

Figure 4:
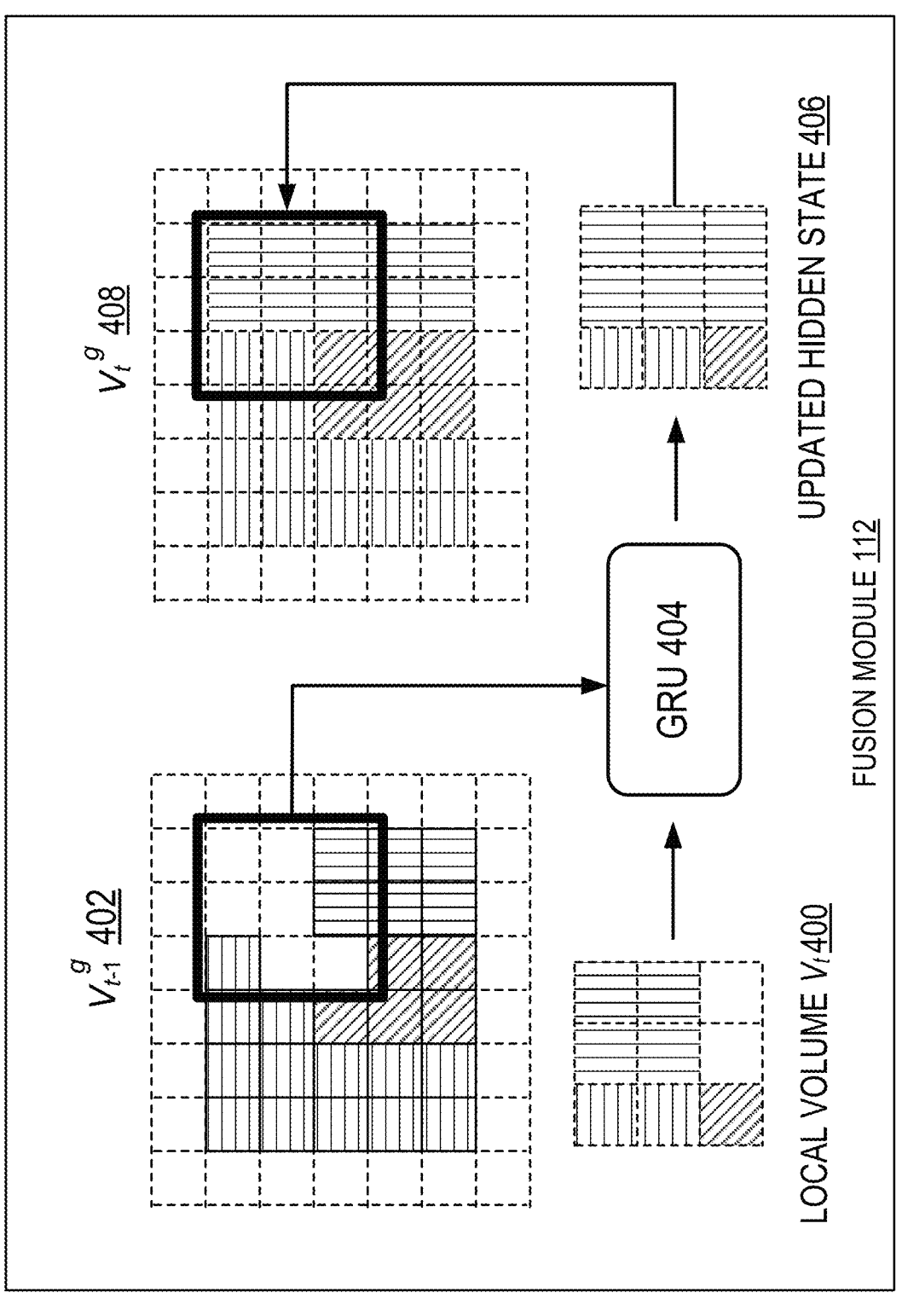
FIG. 4 illustrates a two-dimensional representation of volume fusion in accordance with one or more embodiments.

FIG. 4 illustrates a two-dimensional representation of volume fusion in accordance with one or more embodiments. As discussed, the fusion module 112 may include a GRU which maintains the state of the global volume as its hidden state. The hidden state, which is also the global feature volume $V_{t-1}^g$, is adaptively updated by aggregating new information in the incoming local feature volume $V_t$. As shown in FIG. 4, in a 2D representation, the hidden state is a grid of neural features. This grid grows as more and more local reconstructions are created and the fusion module extends the grid. Additionally, the grid is sparse, so only new voxels will be added when they are observed via the local volume reconstructions.

In the example of FIG. 4, when a new frame is processed, a new local volume $V_t$ 400 is created. This new local volume 400 along with the prior global volume $V_{t-1}^g$ 402 are processed by GRU 404. As shown, the prior global volume $V_{t-1}^g$ 402 has some missing areas that have not appeared yet in the local volumes. The GRU adaptively updates its hidden state based on the new local volume 400 along with the prior global volume $V_{t-1}^g$ 402 to create updated hidden state 406. As noted above, the local volumes and global volumes are constructed in the same coordinate space. Accordingly, the global volume $V_t^g$ 408 is then updated based on the updated hidden state 406. This may include filling in holes with new voxels, extending the grid to include additional voxels, and/or refining the features of existing voxels.

Figure 5:
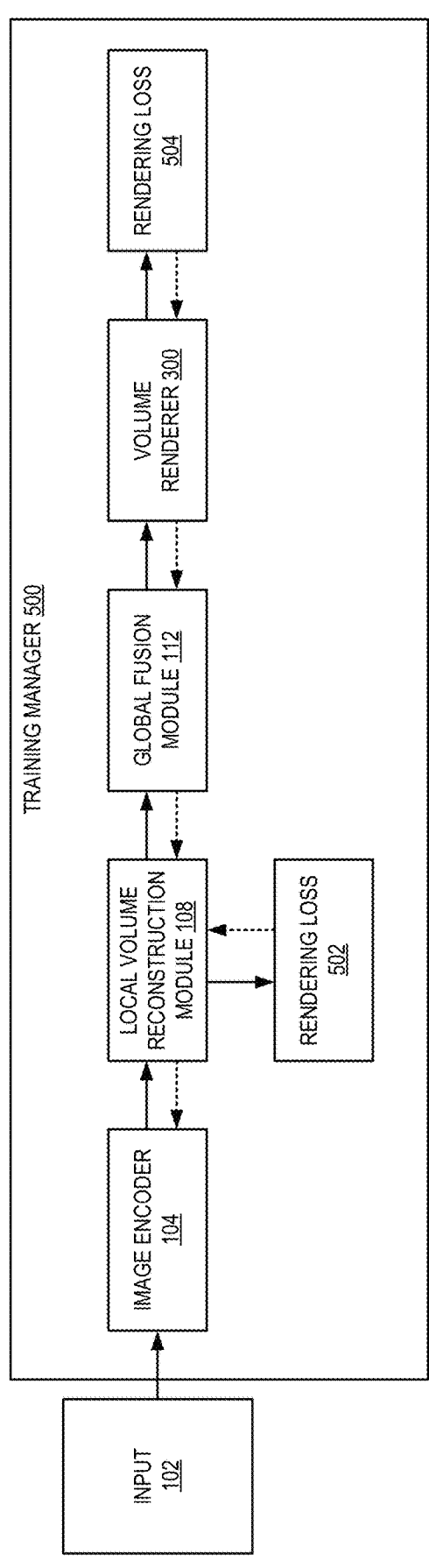
FIG. 5 illustrates an example of training a scene reconstruction system in accordance with one or more embodiments.

FIG. 5 illustrates an example of training a scene reconstruction system in accordance with one or more embodiments. Prior radiance field techniques require per-scene optimization. This means that substantial time (e.g., 12+ hours) is required to train the model for a specific scene before novel views can be synthesized. However, unlike prior techniques, embodiments train the model across-scenes with datasets and the trained model can estimate a field via direct inference. These training datasets, such as ScanNet, include large and small-scale indoor scenes, while other training datasets, such as DTU, include small objects. This training across scenes allows for the model to generalize across possible new scenarios (e.g., camera setups, scene types, etc.).

Training manager 500 is responsible for training the scene reconstruction system. In particular, the local volume reconstruction module and the radiance field decoder (R) are trained with a local loss 502

$$\mathcal{L}_{local} = \|C_t - \hat{C}\|_2^2$$

where $\hat{C}$ is the ground truth pixel color and $C_t$ represents the rendered pixel color using the local volume $V_t$ reconstructed at frame t. This makes the network learn to predict reasonable local neural volumes, which are already renderable and able to produce realistic images locally; it also initializes the radiance field decoder MLP to a reasonable state, which is later shared across local and global volumes. This pre-training allows the local reconstruction module to provide meaningful volume features for the fusion module to utilize in the end-to-end training, effectively facilitating the fusion task. The full pipeline is then trained with the local reconstruction network, fusion network, and the radiance field decoder network all together from end to end, using a rendering loss 504:

$$\mathcal{L}_{fuse} = \sum_t \|C_t - \hat{C}\|_2^2 + \|C_t^g - \hat{C}\|_2^2$$

where $C_t$ is the pixel color rendered from the local reconstruction $V_t$ and $C_t^g$ is the color rendered from the global volume $V_t^g$ after fusing frame t. Basically, every intermediate global and local volume ($V_t$ and $V_t^g$) is taken at every frame to render novel view images and supervise them with the ground truth. The fusion module thus reasonably learns to fuse local volumes from an arbitrary number of input frames.

Once trained, the full network is able to output a high-quality radiance field from direct network inference and produce realistic rendering results. In addition, the reconstructed radiance field as a sparse neural volume can also be easily optimized (fine-tuned) per scene further to boost the rendering quality, as discussed.

FIG. 6 illustrates a comparison 600 of fast reconstruction of volumetric radiance fields of large-scale scenes in accordance with one or more embodiments. As discussed, a video of a scene may be captured by a camera with known camera parameters (e.g., pose, etc.). As shown in FIG. 6, a camera may capture a continuous, monocular video of a scene 602. This is depicted by input view frustums 604. The frames, or sampled images therefrom, are then processed as described herein. This results in a global radiance field that can be used to synthesize novel views 606 of the scene.

Examples of the novel view reconstructions are shown as generated by direct inference 608 by the scene reconstruction system, by a fine-tuned scene reconstruction system 610 which was fine-tuned for 20 minutes, and a prior radiance fields technique, NeRF 612, which was trained on the scene for 12 hours. As shown, the direct inference 608 produces similar results to the NeRF 612 implementation, while the fine-tuned scene reconstruction system 610 results in significantly more realistic reconstructions. As such, embodiments can generate comparable results to state-of-the-art models via direct inference, requiring significantly fewer resources and time. Additionally, with the addition of a brief fine-tuning period the scene reconstruction system can produce more realistic results.

Figure 7:
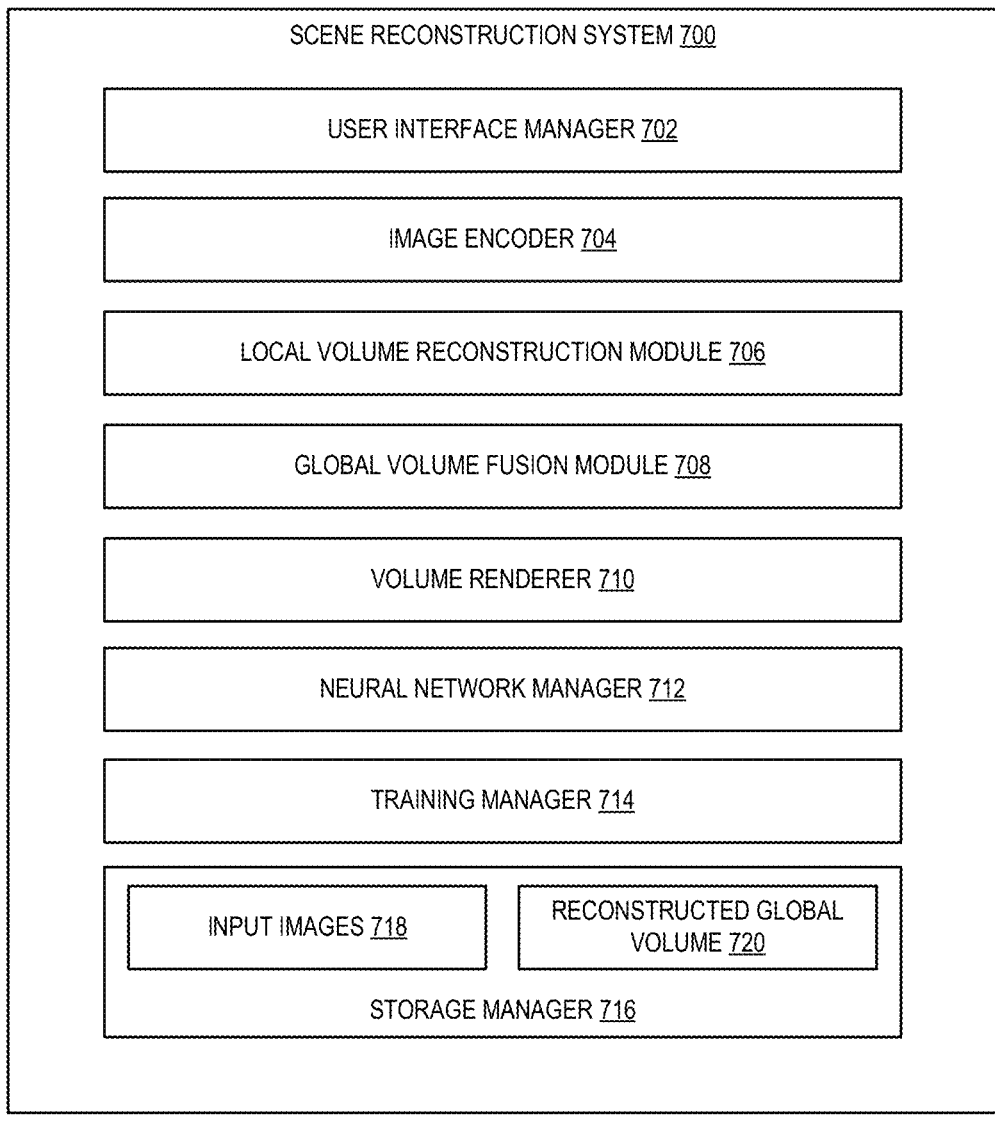
FIG. 7 illustrates a schematic diagram of a scene reconstruction system in accordance with one or more embodiments.

FIG. 7 illustrates a schematic diagram of a scene reconstruction system (e.g., "scene reconstruction system" described above) in accordance with one or more embodiments. As shown, the scene reconstruction system 700 may include, but is not limited to, user interface manager 702, image encoder 704, local volume reconstruction module 706, global volume fusion module 708, volume renderer 710, neural network manager 712, training manager 714, and storage manager 716. The storage manager 716 includes input images 718 and reconstructed global volume 724.

As illustrated in FIG. 7, the scene reconstruction system 700 includes a user interface manager 702. For example, the user interface manager 702 allows users to provide input video or image data to the scene reconstruction system 700. In some embodiments, the user interface manager 702 provides a user interface through which the user can upload the input images 718 which represent the video frames, or sampled frames therefrom, of the scene to be reconstructed, as discussed above. Alternatively, or additionally, the user interface may enable the user to download the images from a local or remote storage location (e.g., by providing an address (e.g., a URL or other endpoint) associated with an image source). In some embodiments, the user interface can enable a user to link an image capture device, such as a camera or other hardware to capture image data and provide it to the scene reconstruction system 700.

Additionally, the user interface manager 702 allows users to request the scene reconstruction system 700 to generate the reconstructed global volume 720 from the input images. Likewise, the user interface manager 702 can enable users to specify a viewing direction and have the scene reconstruction system render a novel view from the specified viewing direction. In some embodiments, the user interface manager 702 enables the user to view the resulting synthesized view of the scene.

As illustrated in FIG. 7, the scene reconstruction system 700 includes an image encoder 704. As discussed, the image encoder 704 may be a machine learning model that processes the input images and outputs corresponding image features. In some embodiments, the image encoder 704 is a deep 2D convolutional neural network which extracts 2D image features for each input image. In some embodiments, all of the input images are processed by image encoder 704 to create corresponding image features. Alternatively, only a subset of the images (e.g., key frames) are processed by the image encoder 704.

As illustrated in FIG. 7, the scene reconstruction system 700 includes a local volume reconstruction module 706. Local volume reconstruction module 706 is responsible for regressing local volumes from the image features extracted by the image encoder 704. As discussed, the local volume reconstruction module 706 may include one or more a machine learning models, such as a 3D CNN, that regresses a local volume 110 based on the image features of the current image being processed and one or more neighboring views. For example, the local volume reconstruction module 706 aggregates the image features across multiple neighboring viewpoints to regress a local volume $V_t$ at frame t, expressing a local radiance field, as discussed.

As illustrated in FIG. 7, the scene reconstruction system 700 includes a global volume fusion module 708. Global fusion module 708 receives the local volume from the local volume reconstruction module 706 and fuses it to the global volume. As noted, the local volumes and the global volume are created in the same canonical space. The global fusion module 708 may be implemented using a recurrent neural network, such as a GRU, and maintains the global volume as its hidden state. Once all frames have been processed, the final hidden state is the reconstructed global volume which can be used to synthesize novel views of the scene.

As illustrated in FIG. 7, the scene reconstruction system 700 includes a volume renderer 710. The volume renderer 710 is responsible for rendering a novel view of the scene from an arbitrary viewing direction using the global volume $V^g$. For example, the volume renderer receives a viewing direction, d, and marches a ray in that viewing direction through the global volume $V^g$. The volume renderer determines where that ray intersects voxels of the volume and then determines the volume density, σ, and view-dependent radiance, c, at these points. Using the volume density and view dependent radiance, novel viewpoints are synthesized.

As illustrated in FIG. 7, the scene reconstruction system 700 also includes a neural network manager 7712. Neural network manager 712 may host a plurality of neural networks or other machine learning models, such as the image encoder 704 or the neural networks of the local volume reconstruction module 706, global volume fusion module 708, or volume renderer 710. The neural network manager 712 may include an execution environment, libraries, and/or any other data needed to execute the machine learning models. In some embodiments, the neural network manager 712 may be associated with dedicated software and/or hardware resources to execute the machine learning models. In various embodiments the neural networks may be hosted in multiple neural network managers and/or as part of different components. For example, image encoder 704, local volume reconstruction module 706, global volume fusion module 708, and volume renderer 710 can each be hosted by their own neural network manager, or other host environment, in which the respective neural networks execute, or the neural networks may be spread across multiple neural network managers depending on, e.g., the resource requirements of each neural network, etc.

As illustrated in FIG. 7 the scene reconstruction system 700 also includes training manager 714. The training manager 714 can teach, guide, tune, and/or train one or more neural networks. In particular, the training manager 714 can train a neural network based on a plurality of training data. For example, the image encoder 704, local volume reconstruction module 706, global volume fusion module 708, and volume renderer 710 can be trained by the training manager as discussed above. Additionally, the volume renderer and reconstructed global volume may be fine-tuned as discussed above. More specifically, the training manager 714 can access, identify, generate, create, and/or determine training input and utilize the training input to train and fine-tune a neural network. For instance, the training manager 714 can fine-tune the volume renderer and reconstructed global volume based on the input images, as discussed above.

As illustrated in FIG. 7, the scene reconstruction system 700 also includes the storage manager 716. The storage manager 716 maintains data for the scene reconstruction system 700. The storage manager 716 can maintain data of any type, size, or kind as necessary to perform the functions of the scene reconstruction system 700. The storage manager 716, as shown in FIG. 7, includes the input images 718. The input images 718 can include a sequence of images, such as frames of a video, keyframes, or otherwise sampled images from a sequence of images, as discussed in additional detail above. In particular, in one or more embodiments, the input images 718 include a sequence of frames of a video of a scene captured by a monocular camera. As further illustrated in FIG. 7, the storage manager 716 also includes reconstructed global volume 720. The reconstructed global volume 720 represents that final state of the fused local volumes, as discussed above. The reconstructed global volume 720 can then be used with the volume renderer to synthesize novel views of the scene.

Each of the components 702-716 of the scene reconstruction system 700 and their corresponding elements (as shown in FIG. 7) may be in communication with one another using any suitable communication technologies. It will be recognized that although components 702-716 and their corresponding elements are shown to be separate in FIG. 7, any of components 702-716 and their corresponding elements may be combined into fewer components, such as into a single facility or module, divided into more components, or configured into different components as may serve a particular embodiment.

The components 702-716 and their corresponding elements can comprise software, hardware, or both. For example, the components 702-716 and their corresponding elements can comprise one or more instructions stored on a computer-readable storage medium and executable by processors of one or more computing devices. When executed by the one or more processors, the computer-executable instructions of the scene reconstruction system 700 can cause a client device and/or a server device to perform the methods described herein. Alternatively, the components 702-716 and their corresponding elements can comprise hardware, such as a special purpose processing device to perform a certain function or group of functions. Additionally, the components 702-716 and their corresponding elements can comprise a combination of computer-executable instructions and hardware.

Furthermore, the components 702-716 of the scene reconstruction system 700 may, for example, be implemented as one or more stand-alone applications, as one or more modules of an application, as one or more plug-ins, as one or more library functions or functions that may be called by other applications, and/or as a cloud-computing model. Thus, the components 702-716 of the scene reconstruction system 700 may be implemented as a stand-alone application, such as a desktop or mobile application. Furthermore, the components 702-716 of the scene reconstruction system 700 may be implemented as one or more web-based applications hosted on a remote server. Alternatively, or additionally, the components of the scene reconstruction system 700 may be implemented in a suite of mobile device applications or "apps."

As shown, the scene reconstruction system 700 can be implemented as a single system. In other embodiments, the scene reconstruction system 700 can be implemented in whole, or in part, across multiple systems. For example, one or more functions of the scene reconstruction system 700 can be performed by one or more servers, and one or more functions of the scene reconstruction system 700 can be performed by one or more client devices. The one or more servers and/or one or more client devices may generate, store, receive, and transmit any type of data used by the scene reconstruction system 700, as described herein.

In one implementation, the one or more client devices can include or implement at least a portion of the scene reconstruction system 700. In other implementations, the one or more servers can include or implement at least a portion of the scene reconstruction system 700. For instance, the scene reconstruction system 700 can include an application running on the one or more servers or a portion of the scene reconstruction system 700 can be downloaded from the one or more servers. Additionally or alternatively, the scene reconstruction system 700 can include a web hosting application that allows the client device(s) to interact with content hosted at the one or more server(s).

For example, a client device can access a webpage or other web application hosted at the one or more servers, and upload or otherwise provide access to the input images. The scene reconstruction system, in this example running as a web application, can then implement the techniques described herein to reconstruct a global volume of the scene depicted in the input images. The client device may also provide a viewing direction. The scene reconstruction system executing on the one or more servers can then use the global volume and a volume renderer to synthesize a view of the scene in the viewing direction. The one or more servers can return the synthesized view to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 9. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks 'M08 will be discussed in more detail below with regard to FIG. 9.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 9.

FIGS. 1-7, the corresponding text, and the examples, provide a number of different systems and devices that enable fast scene reconstruction. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of fast large-scale radiance field reconstruction in accordance with one or more embodiments. In one or more embodiments, the method 800 is performed in a digital medium environment that includes the scene reconstruction system 700. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving a sequence of input images that depict views of a scene. As discussed, the sequence of input images may be obtained from various sources, such as frames of continuous video that depict the scene. In some embodiments, the sequence of input images may be sampled from a continuous video. For example, the sequence of input images may include a plurality of keyframes sampled from the frames of continuous video.

As illustrated in FIG. 8, the method 800 also includes an act 804 of extracting, using an image encoder, image features from the sequence of input images. As discussed, the image encoder may include a 2D CNN which extracts 2D image features from the input images. The image features may be extracted from every image in the sequence of images prior to further processing or may be extracted as needed by later processing stages.

As illustrated in FIG. 8, the method 800 also includes an act 806 of generating, using a first one or more machine learning models, a local volume based on the image features corresponding to one or more images from the sequence of input images. As discussed, a local volume reconstruction module may include one or more machine learning models (e.g., 3D CNNs, MLPs, etc.) that are used to regress a local volume from the image features. In particular, in some embodiments, the local volume reconstruction module receives image features associated with a frame being processed as well as one or more neighboring frames, providing multiple neighboring views from which the local volume is regressed. For example, in some embodiments, generating a local volume based on the image features further includes regressing a local radiance field based on the image features from the one or more images, wherein the one or more images include a first image and one or more neighboring images.

As illustrated in FIG. 8, the method 800 also includes an act 808 of generating, using a second one or more machine learning models, a global volume based on the local volume. As discussed, the global volume may be formed by adaptively fusing local volumes as they are created. For example, in some embodiments, generating the global volume includes recurrently fusing the local volume with a previous state of the global volume using a gated recurrent unit. In some embodiments, the global volume comprises a plurality of voxels having per-voxel neural features, and the method further includes regressing per-voxel volume density based on the per-voxel neural features, and pruning one or more of the plurality of voxels based on the per-voxel volume density to create a sparse global volume.

As illustrated in FIG. 8, the method 800 also includes an act 810 of synthesizing a novel view of the scene based on the global volume. In some embodiments, synthesizing a novel view further includes receiving a viewing direction, identifying one or more voxels associated with the viewing direction using differentiable ray marching, regressing volume properties from the one or more voxels, and synthesizing a novel view associated with the viewing direction using the volume properties.

As discussed, in some embodiments, each image from the sequence of images is processed until the entire sequence has been processed. For example, in some embodiments, the method further includes determining there are additional images in the sequence of input images to be processed, generating a next local volume based on the image features corresponding to a next image in the sequence of input images, and updating the global volume based on the next local volume.

As discussed, a per-scene fine-tuning step may be applied to further improve the quality of the synthesized views. For example, in some embodiments the method further includes fine-tuning the per-voxel neural features in the sparse global volume based on the sequence of input images and a rendering loss to create an optimized sparse global volume and synthesizing a novel view using the optimized sparse global volume.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
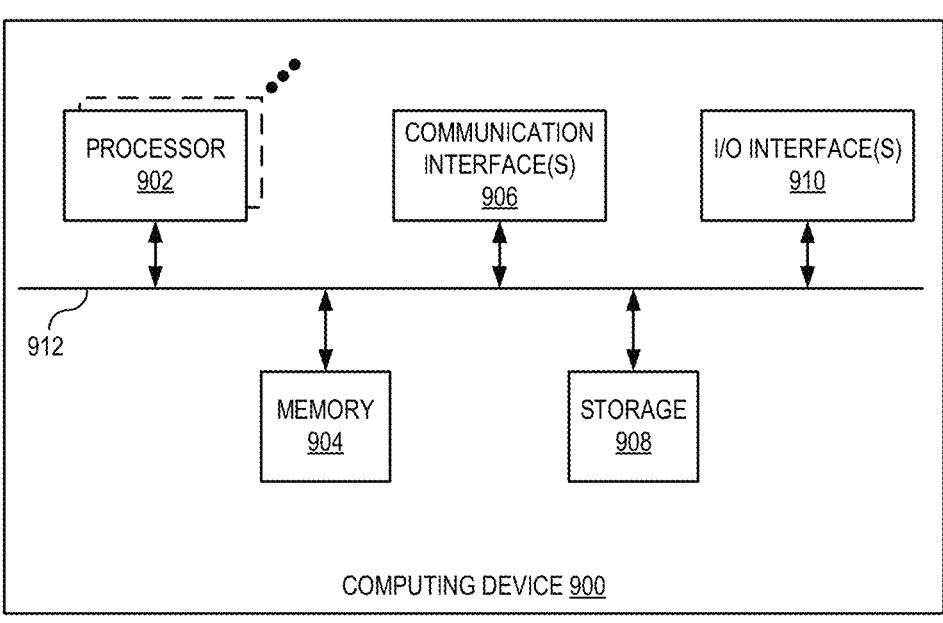
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the scene reconstruction system. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/ interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers.

In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving a sequence of input images that depict views of a scene;
extracting, using an image encoder, image features for an image from the sequence of input images;
generating, using a first one or more machine learning models, a local volume for the image from the sequence of input images based on the image features corresponding to one or more images from the sequence of input images, wherein the local volume defines a local radiance field;
generating, using a second one or more machine learning models, an iterative volume based on the local volume for the image from the sequence of input images and a previous image from the sequence of input images, wherein a combination of the iterative volume is a global volume, wherein the global volume has a global radiance field, and wherein the first one or more machine learning models and second one or more machine learning models are trained end to end using a loss based on the local radiance field and the global radiance field; and
synthesizing a novel view of the scene based on the global volume.

2. The method of claim 1, further comprising:
determining there are additional images in the sequence of input images to be processed;
generating a next local volume based on the image features corresponding to a next image in the sequence of input images; and updating the global volume based on the next local volume.

3. The method of claim 1, wherein generating, using a second one or more machine learning models, a global volume based on the local volume, further comprises:

recurrently fusing the local volume with a previous state of the global volume using a gated recurrent unit comprising an update gate and a reset gate.

4. The method of claim 3, wherein generating, using a first one or more machine learning models, a local volume based on the image features corresponding to one or more images from the sequence of input images, further comprises:

regressing a local radiance field based on the image features from the one or more images, wherein the one or more images include a first image and one or more neighboring images.

5. The method of claim 3, wherein the update gate and the reset gate of the gated recurrent unit determine an amount of information from a previous global volume and an amount of information from a current local volume to incorporate into a next iteration of the iterative volume.

6. The method of claim 1, further comprising:

wherein the global volume comprises a plurality of voxels having per-voxel neural features;

regressing per-voxel volume density based on the per-voxel neural features; and pruning one or more of the plurality of voxels based on the per-voxel volume density to create a sparse global volume.

7. The method of claim 6, wherein synthesizing a novel view of the scene based on the global volume, further comprises:

receiving a viewing direction and viewing location;

identifying one or more voxels associated with the viewing direction using differentiable ray marching;

regressing volume properties from the one or more voxels; and synthesizing a novel view associated with the viewing direction using the volume properties.

8. The method of claim 6, further comprising:

fine-tuning the per-voxel neural features in the sparse global volume based on the sequence of input images and a rendering loss to create an optimized sparse global volume; and synthesizing a novel view using the optimized sparse global volume.

9. The method of claim 1, wherein the sequence of input images include frames of continuous video that depict the scene.

10. The method of claim 9, wherein the sequence of input images includes a plurality of keyframes sampled from the frames of continuous video.

11. A non-transitory computer-readable medium storing executable instructions, which when executed by a processing device, cause the processing device to perform operations comprising:

receiving a sequence of input images that depict views of a scene;

extracting, using an image encoder, image features for an image from the sequence of input images;

generating, using a first one or more machine learning models, a local volume for the image from the sequence of input images based on the image features corresponding to one or more images from the sequence of input images, wherein the local volume defines a local radiance field;

generating, using a second one or more machine learning models, an iterative volume based on the local volume for the image from the sequence of input images and a previous image from the sequence of input images, wherein a combination of the iterative volume is a global volume, wherein the global volume has a global radiance field, and wherein the first one or more machine learning models and second one or more machine learning models are trained end to end using a loss based on the local radiance field and the global radiance field; and synthesizing a novel view of the scene based on the global volume.

12. The non-transitory computer-readable medium of claim 11, wherein the operations further comprise:

determining there are additional images in the sequence of input images to be processed;

generating a next local volume based on the image features corresponding to a next image in the sequence of input images; and updating the global volume based on the next local volume.

13. The non-transitory computer-readable medium of claim 11, wherein the operation of generating, using a second one or more machine learning models, a global volume based on the local volume, further comprises:

recurrently fusing the local volume with a previous state of the global volume using a gated recurrent unit comprising an update gate and a reset gate.

14. The non-transitory computer-readable medium of claim 13, wherein the operation of generating, using a first one or more machine learning models, a local volume based on the image features corresponding to one or more images from the sequence of input images, further comprises:

regressing a local radiance field based on the image features from the one or more images, wherein the one or more images include a first image and one or more neighboring images.

15. The non-transitory computer-readable medium of claim 11, wherein the operations further comprise:

wherein the global volume comprises a plurality of voxels having per-voxel neural features;

regressing per-voxel volume density based on the per-voxel neural features; and pruning one or more of the plurality of voxels based on the per-voxel volume density to create a sparse global volume.

16. The non-transitory computer-readable medium of claim 15, wherein the operations further comprise:

receiving a viewing direction and viewing location;

identifying one or more voxels associated with the viewing direction using differentiable ray marching;

regressing volume properties from the one or more voxels; and synthesizing a novel view associated with the viewing direction using the volume properties.

17. The non-transitory computer-readable medium of claim 15, wherein the operation of synthesizing a novel view of the scene based on the global volume, further comprises:

fine-tuning the per-voxel neural features in the sparse global volume based on the sequence of input images and a rendering loss to create an optimized sparse global volume; and synthesizing a novel view using the optimized sparse global volume.

18. The non-transitory computer-readable medium of claim 11, wherein the sequence of input images includes frames of continuous video that depict the scene.

19. A system comprising:

a memory component; and a processing device coupled to the memory component, the processing device to perform operations comprising:

receiving a sequence of input images that depict views of a scene;

extracting, using an image encoder, image features for an image from the sequence of input images;

generating, using a first one or more machine learning models, a local volume for the image from the sequence of input images based on the image features corresponding to one or more images from the sequence of input images, wherein the local volume defines a local radiance field;

generating, using a second one or more machine learning models, an iterative volume based on the local volume for the image from the sequence of input images and a previous image from the sequence of input images, wherein a combination of the iterative volume is a global volume, wherein the global volume has a global radiance field, and wherein the first one or more machine learning models and second one or more machine learning models are trained end to end using a loss based on the local radiance field and the global radiance field; and synthesizing a novel view of the scene based on the global volume.

20. The system of claim 19, wherein the operations further comprise:

determining there are additional images in the sequence of input images to be processed;

generating a next local volume based on the image features corresponding to a next image in the sequence of input images; and updating the global volume based on the next local volume.

* * * * *